June 3, 1969 R. E. BARRETT 3,447,187
WIPER MECHANISM
Filed May 16, 1966
FIG__1
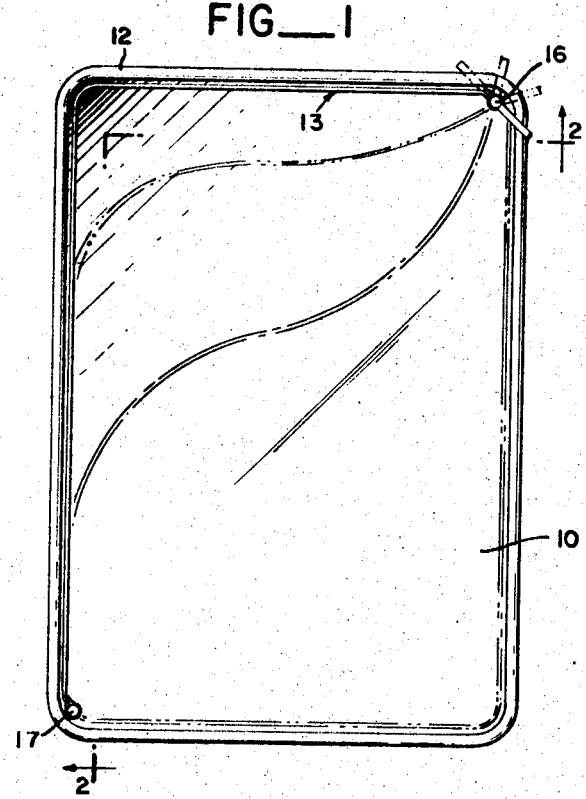
FIG__2
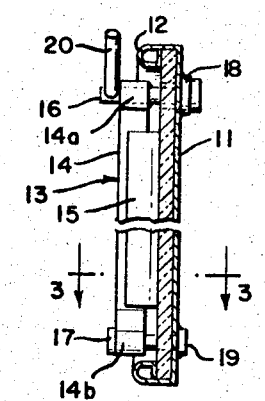
FIG__3
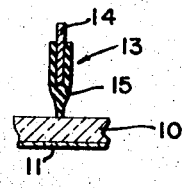
FIG__4
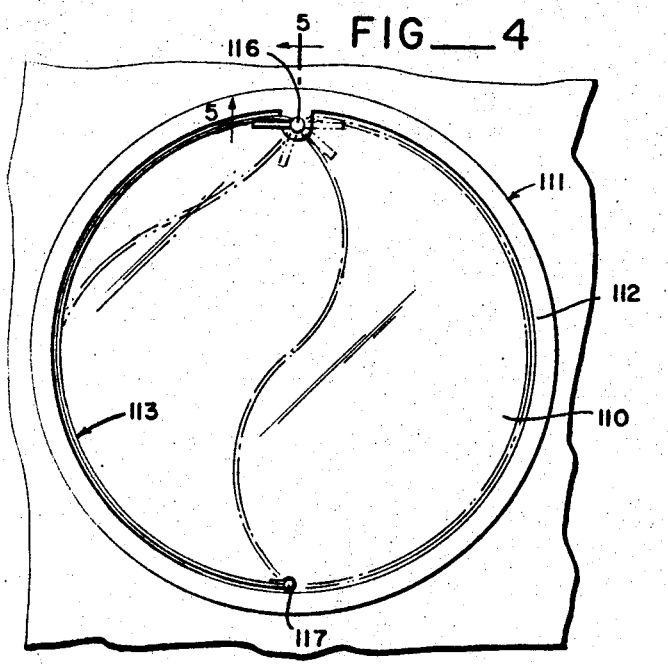
FIG__5
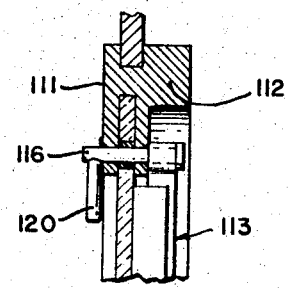
ROBERT E. BARRETT
*INVENTOR.*
BY 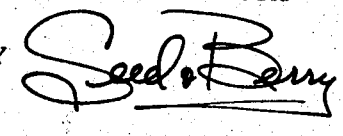
*ATTORNEYS*

3,447,187
WIPER MECHANISM
Robert E. Barrett, 11453 5th S., Seattle, Wash. 98168
Filed May 16, 1966, Ser. No. 550,437
Int. Cl. B60s 1/38
U.S. Cl. 15—250.16                           7 Claims

ABSTRACT OF THE DISCLOSURE

An apparatus for cleaning vehicle mirrors and small windows including a flexible wiper element having a length equal to one-half of the periphery of the surface to be cleaned and fixed at its opposite ends at opposite points on the periphery. An actuating means is connected to the element adjacent one end thereof. In normal operation the wiper moves from one side of the periphery to the other and moving assumes a sinuous shape.

---

The present invention relates to an improved wiper mechanism which is particularly adapted for wiping and cleaning externally mounted motor vehicle mirrors, marine portholes, small windows, and the like.

The invention aims to provide such a wiper mechanism which is of simple and economical construction, gives wiper action over the entire surface to be cleaned with virtually no limitation as to boundary geometry of the surface, does not obstruct the surface when not in use, and is easily adapted to remote operation.

In the field of externally mounted rearview mirrors for motor vehicles the invention aims to provide the driver with a convenient and effective means of cleaning such mirrors of rain, condensation, etc., even while underway to enhance driving safety.

Other more particular objects and advantages of the invention will, with the foregoing, appear and be understood in the course of the following description and claims, the invention consisting in the novel construction and in the adaptation and combination of parts hereinafter described and claimed.

In the accompanying drawing:

FIG. 1 is a front elevational view of a motor vehicle mirror equipped with the present invention;

FIG. 2 is a fragmentary detail sectional view taken as indicated by the line 2—2 of FIG. 1;

FIG. 3 is a transverse sectional view through the wiper blade taken as indicated by line 3—3 in FIG. 2;

FIG. 4 is a front elevational view of a porthole having the invention; and

FIG. 5 is a fragmentary detail sectional view taken along the line 5—5 of FIG. 4.

Referring first to the embodiment illustrated in FIGS. 1-3, there is shown an external rear view mirror unit (often referred to as a side view mirror), as for trucks and other motor vehicles, comprising a glass mirror panel 10 and a backing frame 11 having a border rim 12 gripping the panel. For purposes of example, the mirror is given a generally rectangular configuration with somewhat rounded corners. The rim 12 is purposely raised or projected from the front face of the panel 10 to confine a wiper blade 13 which may take the form of a spring steel strip 14 (having the characteristics of a flat spring) fitted with a rubber wiper 15.

The wiper strip 14 is formed with terminal loops 14a, 14b at its opposite ends which are sleeved respectively over a rotary shaft 16 and a pivot pin 17 located at diagonally opposite corners of the mirror so that a line joining the shaft and pin will bisect the perimter defined by the raised rim 12. Loop 14a is welded or otherwise fixed to shaft 16 to turn in unison therewith as the shaft is oscillated in a suitable bearing 18 as by manual operation of a crank 20. Loop 14b on the other hand is left free to turn about the axis of the pin 17 either by fixing the pin at 19 and leaving the loop 14b free on the pin, or by duplicating the general arrangement at the other end of the wiper. The shaft and pin may find their support at the back of the frame 11 and project forwardly through openings in the glass 10 as shown and/or be supported directly from the rim 12 at the front.

The wiper blade 13 is preferably given a length approximating one-half the perimeter defined by the rim 12 so that it can assume an at-rest nonobstructing position seated against the rim as shown in FIG. 1. Then, when the crank 20 is turned counterclockwise, the corresponding end portion of the wiper blade (upper end in FIG. 1) is forced away from the rim 12 (out from the upper end in the illustrated example), and is caused to move through a ninety degree arc (to the right side in FIG. 1) until it again seats against the rim. During this travel of the upper end of the wiper blade the blade length is deformed from an inverted L configuration through a progression of sinuous generally S-type configurations to an upright reversed L configuration whereat the blade is seated against the right side and lower end of the rim 12 as indicated by the right-hand broken line position in FIG. 1. As a consequence, the blade is caused to wipe across the entire face of the mirror. The crank 20 can then be turned clockwise and cause the wiper blade to return to its original position while again completely sweeping the mirror. If desired, instead of the manually operated crank 20, the rotary shaft 16 can be oscillated by a suitable linkage or train from a remote power source.

Referring to FIGS. 4-5, the invention is shown applied to a round porthole or window comprising a pane 110 mounted in a border frame 111 which projects in the out-of-doors direction to provide a raised rim 112 surrounding the outer face of the pane. Pairs of ears 118 and 119 on opposite sides of the pane extend toward the center of the pane from diametrically opposite parts of the frame 111 to provide journal support for a rotary shaft 116 and a mounting for a pivot pin 117 which extend through openings in the pane.

In this second embodiment the wiper blade is denoted 113 and may be of the same construction as the blade 13, i.e., being fixed to the shaft 116 and free to oscillate on the axis of the pin 117.

A crank 120 or suitable linkage or train is mounted on the shaft 116 at the indoors side of the pane 110 for operating the wiper blade in the same general manner as described with respect to the first described embodiment. At its at-rest position the blade 113 has its length, which is one-half the circumference of the view area of the pane 110, in a general C-shape seated against one-half of the rim 112. As before, the crank 120 is turned to urge one end portion (upper end in FIG. 4) of the wiper blade to the opposite side of the pane, thereby responsively causing the blade to partake of a series of sinuous shapes and to wipe completely across the pane to be again confined by the surrounding frame.

It will be apparent from the foregoing examples that the invention is not restricted to the wiping of rectangular or circular surfaces. All that is required for complete wiping is that the ends of the wiping blade be located at points whereat the perimeter of the surface as defined by the raised rim is bisected by a line connecting the two points, that the blade have a length corresponding to half of the perimeter and that the contour of the border be gentle enough to be capable of being followed by the wiping blade. As a practical matter, normally the surface to be wiped will be symmetrical.

It is believed that the invention will have been clearly understood from the foregoing detailed description of my now-preferred illustrated embodiment.

What is claimed is:

1. In combination, a surface with a raised peripheral rim, a flexible elongated springy wiper blade having a longitudinal wiping edge contacting said surface along its length, said length of the wiping edge being fixed at substantially one-half the perimeter of said surface and said blade being pivotally mounted at its ends adjacent the intersections with said rim of a line bisecting said perimeter so as to be free to engage the inside face of the rim on one side or the other of said bisecting line, and oscillating actuating means connected to said wiper blade adjacent one of said pivots for swinging the respective end portion of the blade back and forth from the rim half on one side of the bisecting line to the rim half on the other side thereof whereby the entire wiper blade is caused to wipe back and forth across said surface in a sinuous path between a limit position resting against the inside face of one said rim half and a limit position resting against the inside face of the other said rim half.

2. The combination according to claim 1 in which said surfaces is symmetrical and said line bisects the area of said surface.

3. The combination according to claim 2 in which said surface is circular.

4. The combination according to claim 2 in which said surface is oblong with rounded corners.

5. The combination according to claim 1 in which said surface comprises the face of a mirror having a frame presenting said rim and carrying the ends of said blade.

6. The combination according to claim 1 in which said surface comprises the face of a transparent port having a border frame presenting said rim and carrying the ends of said blade.

7. The combination according to claim 6 in which said actuating means includes an actuating lever located in the opposite side of said port from said wiper blade.

References Cited
UNITED STATES PATENTS

| | | | |
|---|---|---|---|
| 678,361 | 7/1901 | Flammiger | 15—250.27 |
| 1,994,881 | 3/1935 | Walzer | 15—250 |
| 2,608,708 | 9/1952 | Williamson | 15—250.30 XR |
| 2,893,041 | 7/1959 | Schafer | 15—250.16 |
| 2,896,245 | 7/1959 | Hopponen | 15—250.36 XR |

WALTER A. SCHEEL, *Primary Examiner.*

ROBERT I. SMITH, *Assistant Examiner.*